J. T. TEARE.
LOG FISHING GRAPPLE.
APPLICATION FILED JAN. 2, 1908.
902,344.
Patented Oct. 27, 1908.
2 SHEETS—SHEET 2.
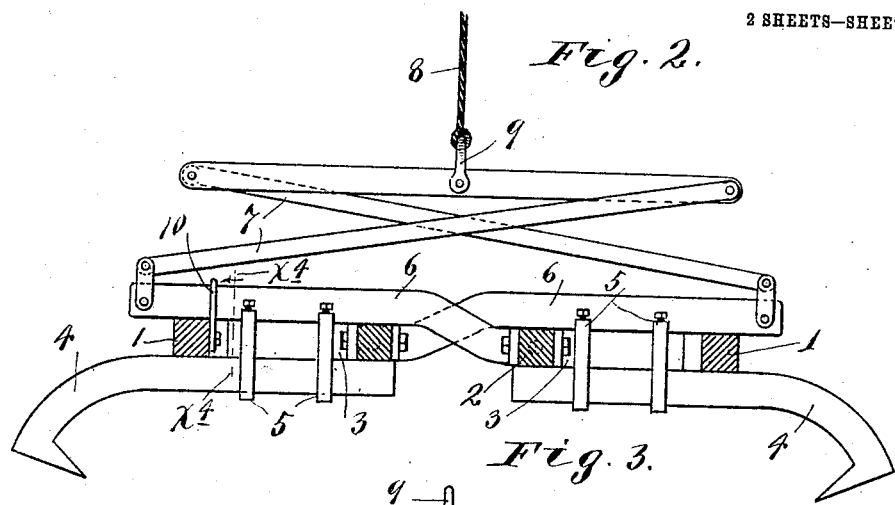
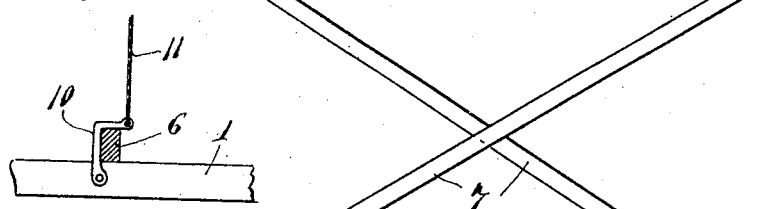
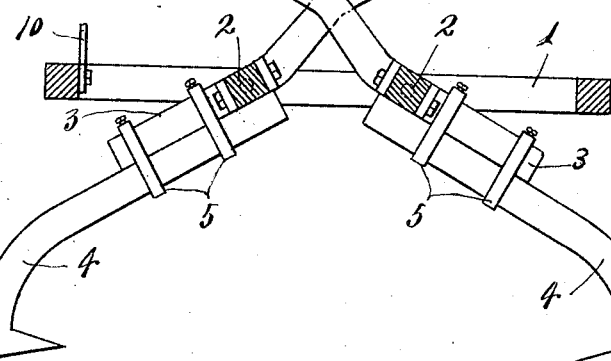
Witnesses
A. H. Opsahl.
L. L. Simpson.
Inventor
James T. Teare
By his Attorneys.
Williamson & Merchant

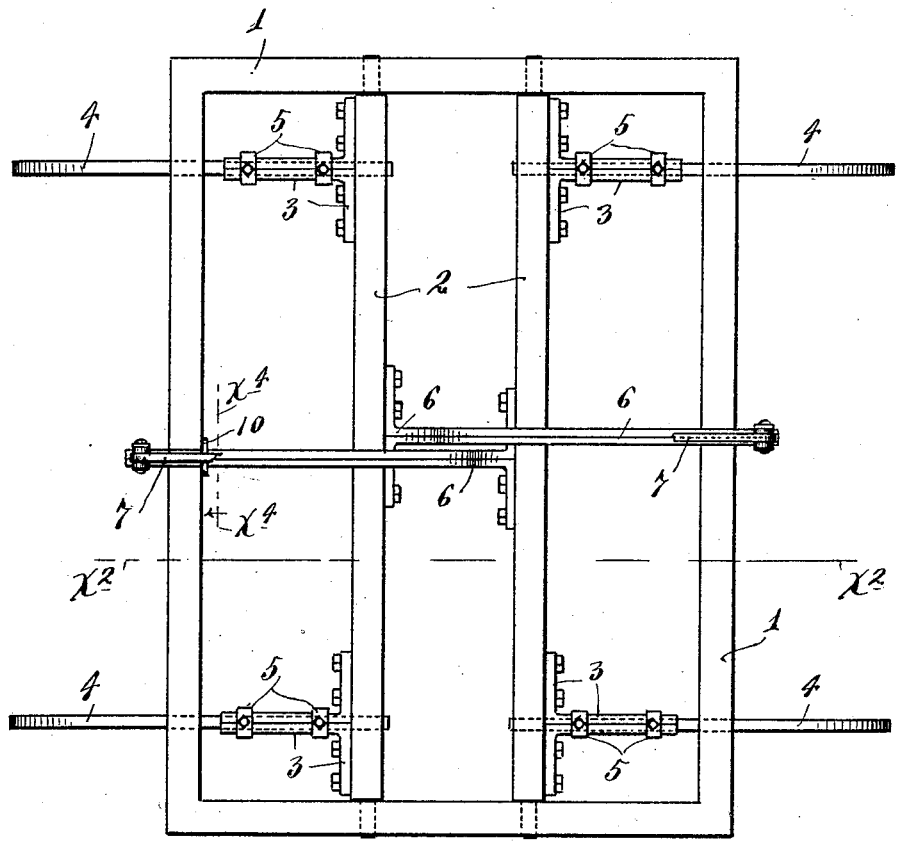

UNITED STATES PATENT OFFICE.

JAMES T. TEARE, OF STILLWATER, MINNESOTA.

LOG-FISHING GRAPPLE.

No. 902,344.　　　　Specification of Letters Patent.　　　　Patented Oct. 27, 1908.

Application filed January 2, 1908. Serial No. 408,953.

*To all whom it may concern:*

Be it known that I, JAMES T. TEARE, a citizen of the United States, residing at Stillwater, in the county of Washington and State of Minnesota, have invented certain new and useful Improvements in Log-Fishing Grapples; and I do hereby declare the following to be a full, clear, and exact description of the invention, such as will enable others skilled in the art to which it appertains to make and use the same.

My invention relates to grapples of the toggle action type; and has for its especial object to provide such a grapple adapted for use in fishing up sunken logs from the bottom of log floating streams, ponds and lakes.

It is a well known fact that in the main streams which have been used, for many years, for floating logs from points near which the timber is cut to far below points where the saw-mills are located, and, in the holding ponds of the sorting booms and mills, a great number of logs have been sunken and remain held either by their own water-soaked weight, their embedment in the mud, or because of other entanglements, far below the surface of the water. This is particularly true, for example, of such great log floating rivers as the upper Mississippi, the St. Croix, etc., in the white pine belt. Pine timber has become so scarce that effort is now being made to raise this old sunken timber from the bottom of streams and ponds, as it is now of the best.

The problem presents difficulties peculiar to itself. For example, the logs may have been in a great jam; and, hence, those left at the bottom of the stream, in such localities, may have been under tremendous pressure in every possible direction, and as a result be badly tangled or jammed together as they lie at or in the bottom of the stream. The purpose of my improved grapple is to meet these special conditions. It is intended to be used in connection with a crane on a floating barge, raft, or ice supported sled.

To the above ends, my invention consists of the novel devices and combinations of devices hereinafter described and defined in the claims.

The invention is illustrated in the accompanying drawings, wherein like notations refer to like parts throughout the several views.

In said drawings; Figure 1 is a plan view of my improved grapple, some parts being broken away, the grapple levers being shown in their open position. Fig. 2 is a cross section, on the line $x^2$ $x^2$ of Fig. 1, with all the parts present and the grapple levers locked in their open position. Fig. 3 is a view on the same section line as Fig. 2, but with the parts shown as they would appear in loaded or loading position; and Fig. 4 is a detail, on the line $x^4$ $x^4$ of Figs. 1 and 2.

The numeral 1 represents a strong, skeleton frame, preferably of oblong form. In the end pieces of this frame 1 are pivoted a pair of rocking bars 2, located parallel with each other and on opposite sides of the median line of the frame. To the bars 2 are bolted, or otherwise rigidly secured, two pairs of grapple-holding levers 3, located one near each end of the respective rocking bars 2. To these holding levers 3, the grapple irons 4 are adjustably secured by means of clamps 5 adapted to embrace the lapping portions of the levers and the grapple irons and to be tightened thereon. These clamp connections permit the grapple irons 4 to be adjusted lengthwise of the holding levers 3, and to be rigidly secured thereto in any adjustment desired to vary the grasping span of said grapple irons.

A pair of crossed pull-up levers 6 are bolted, or otherwise rigidly secured, one to each of the respective rocking bars 2, at a point substantially midway between the two pairs of grapple levers 3. To the main pull-up levers 6 are attached the customary set of lazy tongs 7, to the top member of which the cable 8 is applied by pivoted link 9, in the usual way.

To one of the main side bars of the frame 1 is pivoted a locking lever 10 of the proper angular form or elbow shape to engage with one of the crossed pull-up levers 6, when the grapple irons are in their open position, or as shown in Figs. 1, 2 and 4. All the parts so far named are preferably composed of metal and must be strong.

To the free end of the locking lever 10 is applied a flexible releasing connection 11, which, in practice, is of such length as to extend within reach of the operator who is controlling the loading of the grapple. With this construction, it is obvious that the grapple irons may be temporarily locked in their open position, as shown in Figs. 1, 2 and 4, and that they will so remain until the releasing connection 11 is operated to throw the locking lever 10 away from the lever 6 engaged thereby. Hence, it follows, that the grapple may be lowered to loading or fishing position, with the grapple irons locked in open position; then, when a log is found, the operator can release the lock, and, when the lifting strain is applied to the lazy tongs, the grapple irons will be drawn together in the customary way, and the barbs or hook-shaped ends of the grapple irons 4 will be forced into engagement with the log. The weight of the frame 1 should be such as to permit considerable strain to be applied to the grapple levers before the frame will begin to lift, so as to insure, or at least give a better chance to grasp a log under the closing movement of the grapple irons.

The use of the two pairs of grappling irons 4, in connection with the single pair of pull-up levers 6, centrally disposed between the two pairs of grapple levers, is a matter of importance for this particular class of work; for the reason that it will permit the log and the frame 1 of the grapple to tilt together, but not permit the grapple to tilt relative to the log. It follows that the grapple will retain its hold. If a single pair of grapple irons should be employed, the grapple could tilt relative to the log, and if the log should be fast at one end and free at the other, the grapple would pull lengthwise of the log until it slipped off the end of the same. Otherwise and briefly stated, for this class of work there must be a provision which will permit the log to tip, or otherwise, in many instances, the log could not be pulled out from its jammed in or embedded position; but, on the other hand, the grapple must not be permitted to slip lengthwise of the log or the log may be easily lost.

It is desirable, in such a grapple, to have breaking connections which will break when the maximum strain, for which the device is designed, is reached. Otherwise, as can readily be understood, the entire grapple might easily be lost in work of this class. To meet this requirement, I preferably make the clamps 5 of less strength than any of the other parts subject to the lifting strain; and, hence, the clamps would naturally break first, and the only loss be the clamps and grapple irons.

What I claim is:—

1. In a toggle action grapple, the combination with a main frame, of a pair of rocking bars pivoted to said frame parallel with each other and spaced apart equi-distant from the center line of said frame crosswise thereof, two pairs of grapple levers fixed to said rocking bars, one grapple lever being located near the end of each bar, and a pair of crossed pull-up levers fixed one to each of said bars, substantially midway between the two pairs of grapple levers, substantially as described.

2. In a toggle action grapple, the combination with a main frame, of a pair of rocking bars pivoted to said frame parallel with each other and spaced apart equi-distant from the center line of said frame crosswise thereof, two pairs of grapple levers fixed to said rocking bars, one grapple lever being located near the end of each bar, and the grapple irons of each lever being adjustably secured thereto, and a pair of crossed pull-up levers fixed one to each of said bars, substantially midway between the two pairs of grapple levers, substantially as described.

3. In a toggle action grapple, the combination with a main frame, of a pair of rocking bars pivoted thereto, two pairs of grapple levers fixed to said bars, located one near each end of each bar, a pair of crossed pull-up levers fixed one to each of said bars, substantially midway between the two pairs of grapple levers, a locking lever pivoted to said frame and engageable with one of said pull-up levers to lock all the grapple levers in open position, and a flexible releasing connection extending from said locking lever, substantially as described.

In testimony whereof I affix my signature in presence of two witnesses.

JAMES T. TEARE.

Witnesses:
  ANNA C. ANDERSON,
  FRANK T. WILSON.